United States Patent [19]

Salter et al.

[11] 4,455,288

[45] Jun. 19, 1984

[54] ARRANGEMENT FOR THE ENTRAINMENT OF PARTICULATE MATERIALS

[75] Inventors: David Salter, New South Wales, Australia; David Scott, South Humberside, England

[73] Assignee: Laporte Industries Limited, London, England

[21] Appl. No.: 323,440

[22] Filed: Nov. 20, 1981

[30] Foreign Application Priority Data

Dec. 15, 1980 [GB] United Kingdom ................ 8040046

[51] Int. Cl.³ .................... C01G 23/047; C01G 23/00
[52] U.S. Cl. .................................. 423/612; 423/613; 423/614; 423/76; 414/288; 406/55
[58] Field of Search ................ 423/612, 613, 614, 76; 414/288; 406/55

[56] References Cited

FOREIGN PATENT DOCUMENTS 275385  4/1964  Australia ............................ 423/612

*Primary Examiner*—Delbert E. Gantz
*Assistant Examiner*—Chung K. Pak
*Attorney, Agent, or Firm*—Kane, Dalsimer, Kane, Sullivan and Kurucz

[57] ABSTRACT

In a process for the production of titanium dioxide by the vapour phase oxidation of titanium tetrachloride in which process entrained inert particulate material is passed through equipment used to reduce or prevent the deposition of solids thereon, the quantity of inert particulate material entrained may be affected by the varying back pressure normally obtaining in the equipment. The control of this quantity may be improved by reducing pressure differences (by means of conduit 39) between the inlet (40) and outlet (36) of a mechanical feeding device (29, 30) for the solids. This entails the transmission of the pressure (from the conduit 26) into the solids delivery system 25(17) and this may be alleviated, optionally, by maintaining a head of solids in the system and/or by using a system of pressurized hoppers. The invention enables the quantity of inert particulate material used to be reduced.

6 Claims, 3 Drawing Figures

ARRANGEMENT FOR THE ENTRAINMENT OF PARTICULATE MATERIALS

BACKGROUND OF THE INVENTION

1. Field of the Invention

This invention relates to an arrangement for entraining particulate materials in a carrier gas and to the application of the arrangement to a process for the production of titanium dioxide.

2. Brief Description of the Prior Art

The production of titanium dioxide may be carried out by a process in which titanium tetrachloride is oxidised in the vapour phase. By way of example, such a process may be carried out by introducing preheated titanium tetrachloride and preheated oxygen into a reactor the preheating being conducted to an extent such that the temperature which the mixture of titanium tetrachloride and oxygen would reach on mixing, if no reaction were to take place between them, would be at least 800° C., and allowing reaction between the titanium tetrachloride and oxygen to take place to form titanium dioxide particles and chlorine. The mixed chlorine-containing gases resulting from the reaction may be passed from the reactor at a velocity such that the particles of titanium dioxide are entrained in the gases, the titanium dioxide separated from the entraining gases and the gases treated to enable the chlorine content thereof to be recycled to the manufacture of titanium tetrachloride. The chlorine-containing gases and entrained titanium dioxide particles may be passed through an elongated section of pipework downstream of the reactor to allow some initial cooling to take place, and the titanium dioxide may then be disentrained in primary separation means and the chlorine-containing gases may be passed through a further elongated section of pipework, which allow further cooling to take place, to further separation means comprising filter means which remove residual solids and to purification and compression means which render the gases suitable for direct use for the manufacture of titanium tetrachloride by the chlorination of titaniferous ores.

The above described process is subject to problems arising from the deposition of titanium dioxide; deposits of which are hereafter referred to as "scale" without any limitation to a particular physical form of deposit; on the exposed interior surfaces of the reaction chamber and of associated downstream pipework through which the gases and entrained titanium dioxide particles; which may have a temperature of or in excess of 1000° C. at the point where the reaction between the titanium tetrachloride and the oxygen has finished; is passed while the gases are cooling to a temperature at which the titanium dioxide may be recovered. Scale formation of this nature reduces the rate at which the titanium dioxide particles and entraining gases may be cooled and may have a deleterious effect on pigment quality. Additionally, the accompanying reduction in the free cross section of the reactor and/or pipework may cause an increase in the pressure in the system. Scale formation may also occur on the interior of the pipework in which the separated chlorine containing gases are cooled and transported to the filter means with similar disadvantages.

The problem of scale deposition has been substantially solved by scouring the relevant interior surfaces with an inert particulate material. Such a material may be introduced, preferably substantially axially, into the upstream end of the reactor and or into pipework downstream thereof entrained in a carrier gas at a velocity such that, on impingement on the interior samples of the reaction chamber and/or of the pipework the interior surfaces of such reaction chamber and pipework may be kept free of scale. Alternatively or additionally, such a material may be introduced, preferably substantially axially, entrained in a carrier gas into the pipework through which the separated chlorine containing gases are further cooled and are transported to the said further separation means. Processes for the production of titanium dioxide by the vapour phase oxidation of titanium tetrachloride and the use of an inert particulate material to prevent or reduce scale deposition on interior equipment surfaces are described in, inter alia, British Pat. Nos. 1049282 and 1173592.

It is desirable to ensure that the input of inert particulate material into the system is a continuous input at or near the optimum rate to achieve the desired scouring effect. The use of a too high rate of input causes undue erosion of the interior surfaces which it is desired to protect from scale deposition resulting in a reduction in pigment quality due to contamination and involves extra costs in the provision of the extra quantity of inert particulate material and in the provision of larger handling facilities for it. Since the scale of normal commercial usage is in the range of about 40 to 1000 lbs/hr (18 to 453 kg/hr) of inert material it will be appreciated that the disadvantages mentioned above can be of considerable practical import. The use of a rate of input of inert particulate material which even temporarily falls below a critical level can allow the initiation of scale deposition. Once such deposition has started it is difficult to stop since it provides a substrate for further deposition and it is then necessary to use a disadvantageously large input of high velocity inert particulate material to ensure that, that substrate is completely removed.

The rate of flow of a particulate material in a conduit and hence the mass flow rate, may be determined by the method disclosed in British Pat. No. 1479487 according to which the arrival of a pulse of heat, injected a known distance upstream, at a thermistor is detected and the input and arrival data eletronically processed to give a suitable direct read-out.

Control of the rate of input of inert particulate material presents considerable practical problems in a commercial scale plant for the production of titanium dioxide. The gas pressure prevailing in the system is usually positive due to the generation of a back pressure by the passage of high velocity gases through the various process stages above described in a system which, to prevent venting of chlorine and other gases to the atmosphere or loss of reusable chlorine, is substantially a closed one.

In practice it is found that there is a slight pressure difference, relative to the downstream gas pressure, at filter means comprising the further separation means, of the order of 1 or 2 psi (0.07 to 0.14 bars) a somewhat greater pressure difference at the primary titanium dioxide separation means of the order of up to about 5 psi (0.34 bars) a further pressure difference of about 5 psi (0.34 bars) in the pipework through which the entrained titanium dioxide and inert particulate material is passed and a further slight pressure difference in the reactor. These pressure differences vary somewhat with process variables. The conversion to metric units of pressure above and hereafter except where the content otherwise requires is to the number of such units above atmospheric pressure. The operation of the filter means necessarily involves a periodic pressure variation of about 1 psi (0.07 bars) and may involve a greater variation due to faulty operation. Such variation in pressure is transmitted through the system back to the reactor and beyond. It can be seen, therefore, that the inert particulate material may have to be fed into the carrier gas against a varying pressure which will be over 10 psi (0.69 bars) possibly over 15 psi (1.03 bars) and even, approaching 20 psi (say up to approaching 1.37 bars) upstream of the reactor and may be over 5 psi (0.34 bars) at the point where the separated chlorine containing gases are introduced into the pipework for transport to the filter means, although at this point in the process the variation in pressure may be proportionally greater and may approach 100%. Such pressure conditions lead to uneven operation of the mechanical particulate solids feeding device and, due to this, it has been found necessary to operate with a feed rate from 100% to 300% in excess of the optimum to ensure that at no time does the rate of input of inert particulate material drop below the critical level at which scale deposition may begin. Such a high feed rate leads to problems of its own since a variation in pressure may result in a further temporary increase in the feed rate to close to that at which disentrainment might occur in the course of passage of the particulate material through the process pipework. This would involve putting the pipework temporarily out of service while the disentrained material was being removed.

Inert particulate material may be fed from a hopper by gravity flow to a point at which it is metered in suitable quantity into a flow of carrier gas and from which it is fed with the carrier gas into the reaction chamber or the pipework. A mechanical feeding device such as, for example, a helical screw feeding device is commonly used to meter the particulate material into the carrier gas. Such a feeding device is particularly prone to the problems outlined above.

It has been found that the control of the rate of delivery of the inert particulate material from the hopper to a mechanical feeding device in response to pressure variations existing downstream of that device by, for example, an electronically controlled system of sensors and valves, is insufficiently responsive to provide a satisfactory solution to the problem of variation in the rate of introduction of inert particulate material.

SUMMARY OF THE INVENTION

The present invention provides apparatus for the production of titanium dioxide by the vapour phase oxidation of titanium tetrachloride comprising an oxidation reactor, separation means whereby titanium dioxide produced in the oxidation reactor may be separated from chlorine-containing gases resulting from the reaction, pipework connecting the reactor to the separation means through which the titanium dioxide may be transported entrained in said gases and means to pass inert particulate material into the reactor, and/or pipework, entrained in a carrier gas and to pass said particulate material through the reactor and/or pipework to reduce or prevent scale formation therein, characterised by means to feed the inert particulate material into the carrier gas comprising a mechanical feeding device, having an inlet for inert particulate material associated with an inletconduit and an outlet for inert particulate material associated with an outlet conduit and conduit means for providing a stream of carrier gas and for establishing a stream of the carrier gas in the feeding device outlet conduit thereby to entrain the inert particulate material, and means to reduce pressure differences between the feeding device inlet and the feeding device outlet conduit at the point at which the inert particulate material is introduced into the carrier gas.

The present invention also provides a process for the production of titanium dioxide by the vapour phase oxidation of titanium tetrachloride in a reactor at an elevated temperature, inert particulate material entrained in a carrier gas being passed through the reactor and/or pipework used in the process to reduce or prevent the formation of scale on interior surfaces thereof, characterised in that the inert particulate material is fed into the carrier gas by a mechanical feeding device and in that the pressure difference obtaining at any one time between the feed of inert particulate material into the mechanical feeding device and in the carrier gas at the point at which the inert particulate material is introduced into it is reduced. In such a process the inert particulate material entrained in the carrier gas may be passed into pipework through which the titanium dioxide may be passed from the reactor and transported to primary means for the separation thereof from the hot gases resulting from the reaction and/or into pipework through which the separated gases may be passed from the titanium dioxide separation means to filter means.

By a "mechanical" feeding device is meant a feeding device which acts directly by mechanical means as opposed to, for example, a pneumatic feeding device.

DETAILED DESCRIPTION OF THE PREFERRED EMBODIMENTS OF THE INVENTION

Figure 1:
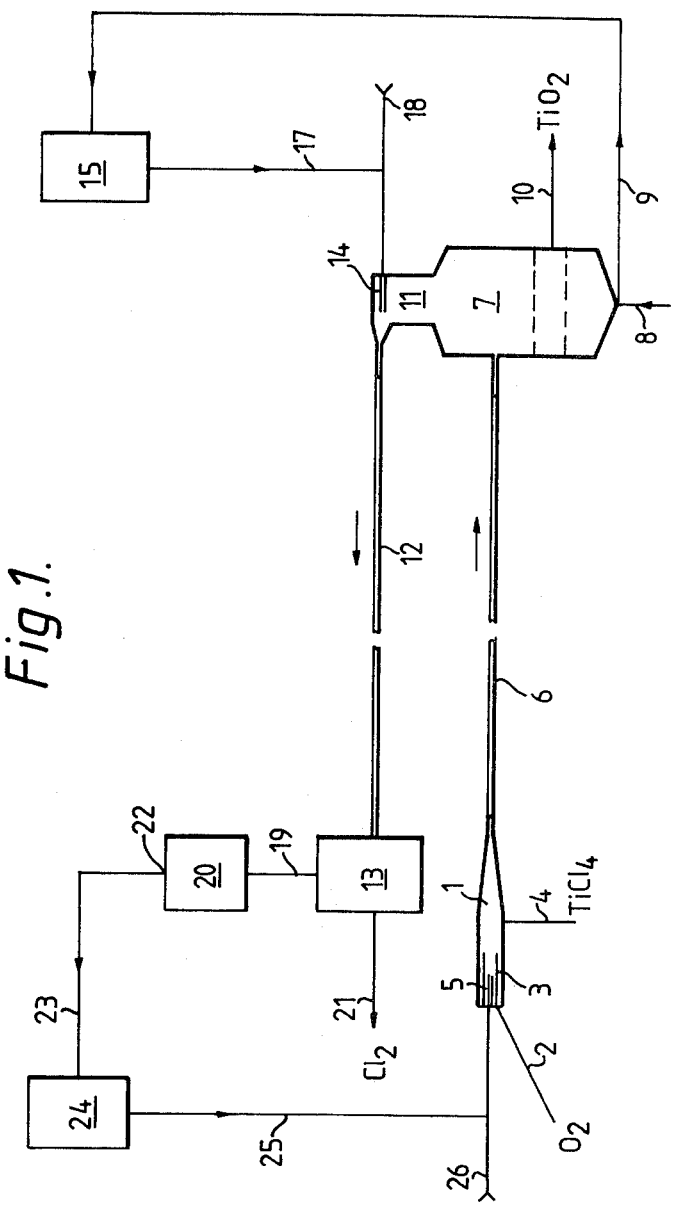
FIG. 1 is a diagrammatic representation, not to scale, of parts of an arrangement of apparatus for the production of titanium dioxide by the vapour phase oxidation of titanium tetrachloride showing the arrangement of the inert particulate material scouring means relative to the main apparatus elements.

In the above described process and apparatus it is found that, despite fluctuations in the pressure obtaining in the reaction chamber, and consequently at the point of feed of the inert particulate material into the carrier gas, the metering of the inert particulate material into the carrier gas may be relatively unaffected by such fluctuations. It has been found, that, as a result, the quantity of inert particulate material used can be considerably reduced without undue detriment to the operation of the process and/or apparatus or to the quality of the titanium dioxide produced.

According to the invention the pressure in the inert particulate solids inlet conduit to the feeding device may be equalised or substantially equalised with the pressure in the carrier gas at the point where the inert particulate material is introduced into it by providing a gas flow interconnection means between the feeding device solids inlet conduit and a conduit containing the carrier gas, either at the point where the inert particulate material is introduced into it or at a point removed from said point of introduction but subject to the pressure variations arising from the operation of the process for the production of titanium dioxide described above. While the ideal is that the interconnection is such that the pressures referred to are exactly equalised an advantageous effect according to the invention may be obtained by any diminution of the pressure difference normally existing between the inlet conduit to the particulate material mechanical feeding device and the outlet therefrom. Preferably the said pressure difference is reduced according to the invention to less than 10 psi (0.69 bars) particularly preferably to less than 5 psi (0.34 bars) for example, most preferably, less than 2 psi (0.14 bars). Preferably, the gas-flow interconnection means comprises a gas flow conduit directly connecting the feeding device inlet conduit with a conduit containing carrier gas. By a gas flow interconnection or conduit is meant one which allows substantially unimpeded gas flow so that any pressure differences may be reduced or eliminated wihout any appreciable time lag for example, in less than 1 second. These terms therefore, exclude interconnection through the feeding device itself.

For use as above described in a process for the production of titanium dioxide by the vapour phase oxidation of titanium tetrachloride the inert particulate material is, suitably, a refractory material which is not substantially attacked by chlorine under the conditions obtaining in the reaction chamber and downsteam pipework and which is sufficiently hard to effect the desired scouring action. The inert particulate material may, for example, be zircon particles or alumina particles or, suitably titanium dioxide particles. One process for producing suitable titanium dioxide particles is described in Canadian Patent Specification No. 599557. That patent describes a process for cooling a reaction product stream of titanium dioxide and accompanying gases which results from the vapour phase oxidation of titanium tetrachloride the process comprising passing said stream through an externally cooled conduit while removing titanium dioxide adhering to the walls of the conduit by adding to said stream, in an amount of about 1 to 10% by weight of the titanium dioxide in the stream, titanium dioxide granules obtained by water washing, collecting and heating to a temperature within the range of 500° C. to 900° C. titanium dioxide dust from a fluid energy mill used for grinding to pigment particle size the titanium dioxide pigment produced in a vapour phase oxidation of titanium tetrachloride, separating the titanium dioxide exiting from the cooling conduit and the exiting gaseous products and recovering the cooled titanium dioxide Advantageously the inert particulate material is silica sand. The inert particulate material may, alternatively, be a mixture of one or more of the aforementioned materials.

Preferably the inert particulate material has a particle diameter not more than 1700 microns the practical upper limit of the size thereof being determined by the requirement that it should be carried out of the reaction chamber and downstream pipework by the gas stream. Advantageously essentially all of the inert particulate material has a diameter within the range of approximately 400 to approximately 1,700 microns.

The inert particulate material may suitably be delivered to the feeding device from a storage hopper at least partly by gravity means for example by means of a substantially vertical; that is having an angle of less than 10° with the vertical; or steeply upwardly inclined; that is having an angle of less than 45° with the vertical; closed conduit which has a section sufficient to allow free flow of particulate material having regard to its particle size, its particle shape, the presence of surface contaminants; for example where the particles have been recycled after separation therefrom of titanium dioxide formed in the reaction chamber and, as a result, bear some surface adhering titanium dioxide, and other considerations. The mechanical feeding device may be, for example, a helical tapered screw feeding device, a rotary vane airlock feeding device, a vibratory feeding device or such other mechanical feeding device capable in normal use of continuous delivery of a predetermined quantity of particulate material. Such a device may be powered, for example, by an electric motor through suitable gearing. The mechanical feeding device may be arranged to feed in any plane relative to the horizontal although it may be found advantageous for it to be arranged to feed upwardly or, even, vertically.

The entrainment of the inert particulate material issuing from the feeding device may be carried out by the introduction thereof into a stream of carrier gas in one or several stages. Provided that the velocity of the carrier gas is sufficient to prevent blockage at the outlet from the feeding device it is not necessary for full entrainment of the particulate material to occur at that point.

The carrier gas may be any gas which is not deleterious to the process for the production of titanium dioxide. The carrier gas may, for example, be chlorine gas although, since the operation of this invention may, in at least some embodiments, involve the venting of gas to the atmosphere, in such embodiments this may not be preferred. Preferably the carrier gas is a chemically inert gas, such as nitrogen, or is oxygen or is, particularly preferably, a mixture of oxygen and inert gases, very suitably air.

By virtue of the equalisation or substantial equalisation of the pressure at the inlet to the particulate material feeding device with that in the carrier gas at the point at which the particulate material is introduced into it or the reduction of pressure differences therein the back pressure generated in the process for the production of titanium dioxide will be transmitted into the particulate material delivery conduit.

It has been found that the order of back pressure involved can easily be such as to cause fluidisation of the inert particulate material in its delivery conduit, or other effects which may interfere with the delivery thereof, unless precautions are taken to avoid this. It has been found that, in the case where the particulate material comprises clean round particles of silica sand having a particle diameter in the range 400 microns to 1700 microns, a pressure of up to about 0.55 psig per foot (0.1 bars/metre) of vertical head of the column of sand in the delivery conduit could be accepted without causing fluidisation of other interfering effects. To give an operating margin for the use of other particulate materials, for example recycled silica sand carrying adhering titanium dioxide pigment on its surface, it is preferable to provide a head of particulate material of not less than twice this height. When operating a process according to the invention, when a maximum back pressure of up to about 10 psig is involved for example, it is practical to provide a sufficiently large head of the inert particulate material in the delivery conduit to prevent fluidisation. Under these conditions the bleed of carrier gas percolates upwardly through the particulate material eventually venting from the hopper. According to such an embodiment of the invention it is preferred that such percolation takes place. Where a maximum back pressures of the order of higher than 10 psig (~0.7 bars) is involved it is apparent that it would be necessary to provide, in some cases, an impractically large head of particulate material in the delivery conduit, particularly since the siting of the process equipment, and therefore the siting of the particulate material entrainment point will, in most plant layouts, be at a level considerably above ground level. The provision of a hopper of inert particulate material at such a high level together with its associated supporting structure would give rise to considerable extra constructional expense.

It has been found that this further problem in relation to maximum back pressures in the range of above 10 psig (0.69 bars) can be alleviated in a satisfactory manner if, in situations where such a back pressure may develop, the supply of inert particulate material is itself pressurised to a degree sufficient at least to prevent fluidisation. This enables a suitably reduced head of inert particulate material to be used in conjunction with said pressurisation to attain the desired effect. The hopper of inert particulate material may itself be pressurised although this would give rise to problems of achieving an even supply of inert particulate material while the hopper is being depressurised, replenished with particulate material and repressurised. Preferably one or more storage facilities are provided in the inert particulate material conduit between the hopper and the feeding device such storage facility or facilities being pressurised and the particulate material hopper itself being either freely vented to the atmosphere or, pressurised as desired. Particularly preferably, two such storage facilities are provided in series in said inert particulate material conduit each being pressurised. By the use of a suitable system of valves in the particulate material delivery conduit the upstream facility may be isolated from the downstream one, depressurised and replenished from the hopper while the inert particulate material is being supplied normally from the downstream facility. When the upstream facility has been replenished it maybe isolated from the particulate material hopper, repressurised and reconnected with the downstream facility to enable that in turn to be replenished with particulate material. Particularly preferably, such a series arrangement is arranged to allow inert particulate material to be fed from the hopper to the feeding device under the influence of gravity. The storage facilities in the particulate material delivery conduit may be enlarged sections in said conduit but are, preferably, closed hoppers connected with said conduit. The uppermost storage facility may be replenished either from an unpressurised hopper by gravity feed, or through a conduit through which the inert material may be transported pneumatically.

The pressure in the storage facilities above described, during the feeding of the particulate material, should preferably be such that the back pressure generated downwardly in the particulate material delivery conduit is not greater than the back pressure generated by the process for the production of titanium dioxide transmitted to the said delivery conduit by the bleed of carrier gas.

Very suitably the inert particulate material may be introduced into the reaction chamber admixed with the oxygen. Suitably, this is achieved by first entraining the inert particulate material in its carrier gas which, as described above, may contain oxygen and feeding the stream of carrier gas containing entrained inert particulate material into a preheated oxygen-containing gas stream. This serves to bring the inert particulate material and its carrier gas up to a suitable temperature for introduction into the process for the production of titanium dioxide and, since the oxygen containing gas stream can be preheated to extremely high temperatures if desired, for example by the process described British Pat. No. 1479319 which operates by passing the gas to be heated through a distributed electrical discharge, this is a satisfactory method of operation. Additionally, the carrier gas itself may be preheated. The titanium tetrachloride may be preheated by means of an electrical resistance heating device having a resistance element of platinum or of a platinum alloy in the form of wire or of a finned tube as described in British Pat. No. 1267803 or 1248572.

The inert particulate material is, preferably, introduced into the supply conduit for the oxygen-containing gas stream at a velocity at of least 6 metres per second and, preferably, of from 14 to 13 metres per second. The upper limit of velocity is determined by the requirement that it should not be so high as to cause undue wear of the interior surface of the reactor or of the pipework downstream thereof. Preferably, to avoid undue wear the inert particulate material is introduced into the supply conduit for the oxygen containing gas stream at a velocity not exceeding 55 metres per second and, particularly preferably, not exceeding 40 metres per second.

The detention time of the entrained inert particulate material and the titanium dioxide in the entraining gases passing through the reaction vessel and the pipework downstream thereof is preferably not more than 10 seconds but is very suitably at least 1 second and preferably at least 2 seconds.

The inert particulate material and the titanium dioxide may be separated together from the entraining gases at the titanium dioxide separation means by causing them to disentrain by reducing the velocity of the entraining gases, for example by passing them into a settling chamber. In such a chamber a bed comprising a mixture of titanium dioxide and the inert particulate material forms. Titanium dioxide and inert particulate material may be recovered from such a mixture by known means for example by the process described on British Pat. No. 1098881 according to which a gas is passed upwardly through the mixture so that a lower, at least partly non-fluidised, layer of inert particulate material and an upper, at least partly fluidised, layer of titanium dioxide forms and the titanium dioxide and the particulate materials are separately withdrawn from their respective layers. Since this titanium dioxide and inert particulate material are contaminated respectively with residual inert particulate material and with residual titanium dioxide they are each purified by being incorporated with water, agitated, and separated into a slurry of titanium dioxide and inert particulate material mixed with water in the manner also described in British Pat. No. 1098881.

The inert particulate material may be separated from the entraining chlorine containing gases immediately before these gases are passed to the filter means by a similar disentraining technique followed, if necessary, by cyclone means to remove larger remaining particles from the gases before filtration. The filtered gases may then be treated by the process described in British Pat. No. 1248398, according to which process the gases are passed at a temperature not exceeding 50° C. through a scrubber containing concentrated sulphuric acid and the scrubbed gases are compressed by means of a liquid piston compressor in which the liquid is concentrated sulphuric acid and the compressed gases are passed through a mist filter.

One embodiment of the invention will now be described with reference to the accompanying drawings.

The apparatus shown in FIG. 1 comprises the following elements:

In a reactor 1, into which preheated oxygen may be introduced through conduit 2 and injector 3, and preheated titanium tetrachloride may be introduced through conduit 4, injector 5 for inert particulate material is provided within the oxygen injector 3 and is positioned axially with respect to the reactor and the pipework 6.

Figure 3:
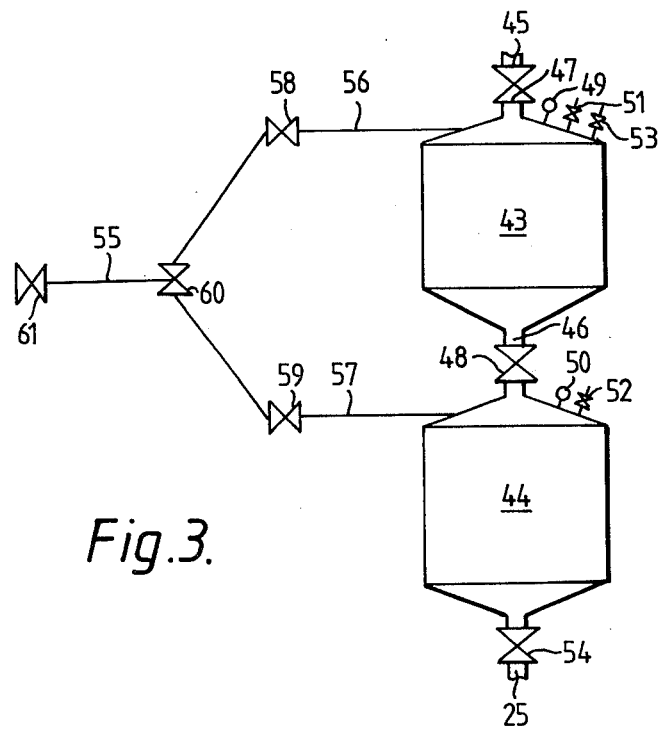
FIG. 3 is a diagrammatical elevational view of an arrangement of hoppers for inert particulate material according to the invention.

The reactor 1 is connected with a titanium dioxide/inert particulate material primary separator 7 through pipework 6 shown broken in the figure. The separator 7 is equipped with a gas inlet 8 and with an inert particulate material outlet 9 and a titanium dioxide outlet 10. The separator 7 is also equipped with a gas outlet 11 leading to pipework 12, which in turn leads to filter 13 and with inert particulate solids injector 14 axially positioned with respect to the pipework 12. The outlet 9 for inert particulate material from the separator 7 leads to the inert particulate material storage facility, 15, which is an atmospheric pressure vented hopper, through conduit 16. Conduit 17 is provided for the return of the inert particulate material to the injector 14 and leads to a carrier gas conduit 18. Conduit 17 is substantially vertical or upwardly inclined relatively long conduit giving a sufficient head of inert particulate material, in use, to accept the back pressure at this point in the process without fluidisation of the inert particulate material in the conduit. The filter 13 has an inert particulate solids outlet 19 leading to a solids purification stage 20, and a filtered gases outlet 21. The inert particulate solids purification stage has an outlet 22 and an inert particulate solids conduit 23 leading to a storage facility 24 which is a system of hoppers as illustrated in FIG. 3 and described hereafter. A further inert particulate material conduit 25 which is relatively short leads to carrier gas conduit 26. It will be understood by those skilled in the art that many minor items of equipment which may be used in the production of titanium dioxide are not specifically shown in FIG. 1. For example, the titanium dioxide removed through conduit 10 is treated to remove residual inert particulate material therefrom and the inert particulate material removed through conduit 9 is treated to remove residual titanium dioxide therefrom by incorporating water with the titanium dioxide and with the inert particulate material, agitating, and separately recovering a slurry of titanium dioxide and inert particulate material mixed with water. The inert particulate material is then dried. Like means are used to purify the inert particulate material, recovered by filter 13, in the purification means 20.

Figure 2:
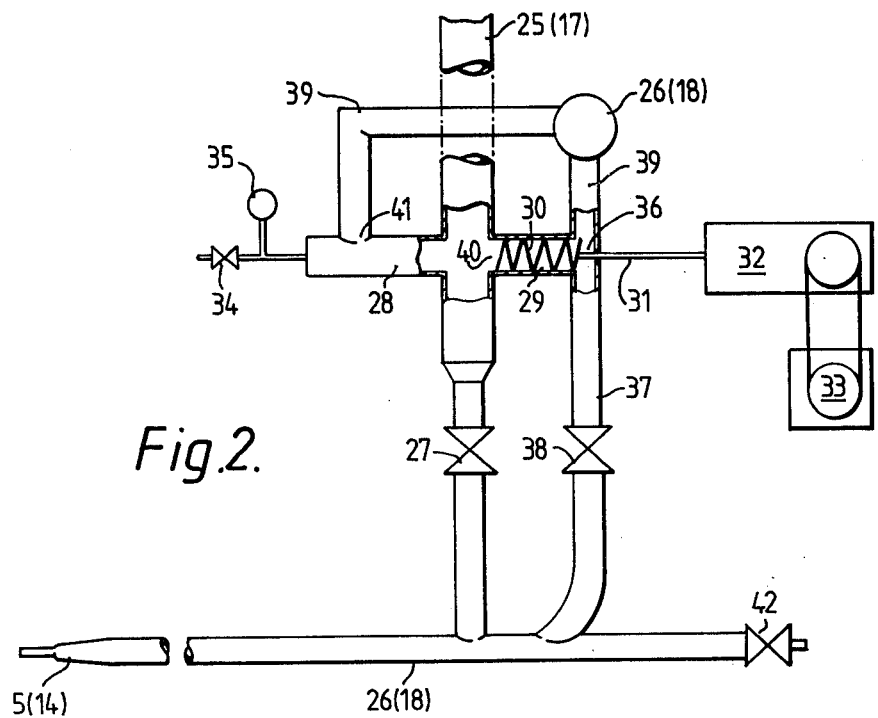
FIG. 2 is a diagrammatic elevational view, in part section, of an arrangement according to the invention for feeding inert particulate material, including means for equalising the pressure at the inlet to the mechanical feeding device with that at the point in the carrier gas conduit at which the particulate material is introduced into it.

In the apparatus described with reference to FIG. 1 there are two injectors for inert particulate material 5 and 14 each of which is provided with a separate arrangement for feeding inert particulate material as shown in FIG. 2. In FIG. 2, the conduit for inert particulate material 25 (or 17) (shown broken in FIG. 2 for clarity only) is terminated by valve 27. Just above valve 27 is provided cross arms 28, and 29. The arm 29 houses a helical screw feeder 30 driven through rotary shaft 31 via gearing 32 by electric motor 33. The arm 28 is terminated by a relief valve 34 and a pressure gauge 35. The carrier gas conduit 26 (or 18) leads to the outlet 36 from the screw 30 at which point the inert particulate material may be entrained in the carrier gas and passed through conduit 37 and through the valve 38 to the inert particulate material injector 5 (or 14). Conduit 39 leads in two directions from carrier gas conduit 26 (or 18) (which conduit 39 is not connected with conduit 25 (or 17) but lies beside it) to join cross-arm 28 at point 41 and cross arm 29 at point 36 thereby, in use, to allow a pressure equalisation between the said points. Valve 27 is also connected to conduit 26 (or 18) at a point downstream of valve 38 to enable inert particulate material to be directly fed into conduit 26 (or 18) and to be entrained in the carrier gas should the mechanical feeder 30 be out of service. Valve 42 is provided to enable the downstream part of conduit 26 (or 18) to be cleared should it become blocked with disentrained inert particulate solids. If desired the inert particulate material storage facilities 24 and 15 may be one and the same.

A hopper arrangement shown in FIG. 3 is provided to supply the inert particulate material conduit 25, and is shown in FIG. 1 merely as storage facility 24. It consists of vertically disposed hoppers 43, and 44 for inert particulate material connected by conduits 46 and connected to inert particulate supply conduit 45, interrupted respectively by valves 48 and 47. Hoppers 43 and 44 are sealed and provided with pressure indicators 49 and 50 and pressure relief valves 51 and 52 and hopper 43 is provided additionally with openable atmospheric vent valve 53. Conduit 25 is provided with valve 54 just below hopper 44. A pressurised gas supply is provided to hoppers 43 and 44 through conduit 55 and branch conduits 56 and 57 provided with valves 58, 59, 60 and 61 to enable the pressure to be controlled and adjusted while the inert particulate material is being transferred through conduit 46.

In the operation of the apparatus above described oxygen and preheated titanium tetrachloride each preheated sufficiently to give a mixed gas temperature of at least 800° C. are introduced into the reactor 1 through conduits 2 and 4 together with inert particulate material through conduit 25 entrained in a carrier gas supplied through conduit 26. The inert particulate material is passed from a hopper arrangement as shown in FIG. 3 through a feeding and entrainment arrangement as shown in FIG. 2.

In operation of such an arrangement the hoppers 43, 44 are initially stocked with inert particulate material and are then pressurised. Inert particulate material from hopper 44 is then fed through conduit 25 to the feeding and entrainment arrangement shown in FIG. 2. The pressure in the hopper 44 is maintained at approximately the back pressure expected from the process for the production of titanium dioxide, variations from that pressure resulting in minor oscillations of the gas in the conduit 25. Hopper 44 is maintained replenished from hopper 43 which is at the same pressure as hopper 44 allowing merely for the pressure drop required to allow a flow of solids from hopper 43 to hopper 44. Hopper 43 is replenished at atmospheric pressure by closing valve 48, releasing the pressure in the hopper and opening valve 47, feed from hopper 44 to conduit 25 being continued. When hopper 43 is replenished valve 47 is closed, the hopper is repressurised and valve 48 is opened.

The titanium dioxide resulting from the reaction and the inert particulate material are passed entrained in mixed chlorine containing gases resulting from the reaction and having a temperature of up to 1100° C. along pipework 6 in which the temperature decreases by about 600° C. to the separator 7 in which titanium dioxide and inert particulate material are separated from each other and the entraining gases and the titanium dioxide recovered and the inert particulate material passed to a hopper arrangement as shown in FIG. 3 denoted in FIG. 1 merely by storage facility 15, passed therefrom to feeding and entraining arrangement as shown in FIG. 2 and passed through injector 14 into conduit 12 through which the chlorine containing gases separated from the solids in separator 7 are passed to filter 13 while their temperature is decreasing by about a further 450° C. The inert particulate solids separated in the filter 13 are purified in purification means 20 and then, are passed to the arrangement of hoppers shown in FIG. 3, denoted in FIG. 1 as 24, for recycle through conduit 25 to the reactor 3. The chlorine containing gases removed from the filter 13 are removed through conduit 21 are cooled to a temperature not above 50° C., are then scrubbed with concentrated sulphuric acid, are then compressed by means of a liquid piston compressor using concentrated sulphuric acid as the liquid and are then filtered in a mist filter. The treated chlorine containing gases may then be further treated by known means, if desired, to reduce its content of inert gases, and may then be used to chlorinate titaniferous ore to produce titanium tetrachloride therefrom by known means, for example by the process described in British Pat. No. 1451144.

In a trial of the present invention it was found possible to operate continuously without scale buildup, as monitored by pressure measurements, using 75 kg of inert particulate material, in total, per tonne of pigment produced. Without the use of the present invention it had been found decessary to use at least 150 kg of inert particulate material per tonne of titanium dioxide produced to attain similar continuous operation.

We claim:

1. In a process for the production of titanium dioxide by the vapour phase oxidation of titanium tetrachloride in a reactor at an elevated temperature, inert particulate material being entrained in a carrier gas under conditions of pressure variation of at least 0.34 bars due to the effect of process variables and being passed through the reactor and/or pipe-work used in the process to reduce or prevent the formation of scale on the interior surfaces thereof, the improvement which comprises; feeding the inert particulate material into the carrier gas by a mechanical feeding device having an inlet for inert particulate material associated with a hopper fed inlet conduit and an outlet for inert particulate material associated with conduit means for providing a stream of carrier gas so as to entrain particulate material issuing from the outlet from the feeding device, and in that the pressure difference between the feeding device inlet and outlet are substantially eliminated by the provision of gas flow interconnection means directly connecting the said inlet or said inlet conduit with said outlet or with the associated conduit means, and in that the feed of inert particulate material is below 150 Kg per tonne of titanium dioxide produced.

2. The process of claim 1 wherein particulate material passes through the hopper fed inlet conduit under the influence of gravity.

3. The process of claim 2 wherein said passage is under a vertical head of not less than 2 meters per 0.1 bars of maximum back pressure generated by the process, said maximum back pressure being up to 0.7 bars.

4. The process of claim 2 wherein the particulate material is delivered to the inlet conduit under sufficient pressure to prevent fluidisation of said particulate material.

5. The process of claim 4 wherein means is provided to introduce additional inert particulate matter into said mechanical feeding device under said pressure.

6. The process of claim 5 wherein the additional inert particulate matter is recycled matter previously used in the process.

* * * * *